United States Patent [19]

Seidel et al.

[11] Patent Number: 5,009,128
[45] Date of Patent: Apr. 23, 1991

[54] INDICATING SYSTEM FOR AN AUTOMATIC MOTOR VEHICLE TRANSMISSION

[75] Inventors: Willi Seidel, Eberdingen-Hochdorf; Roland Ehniss, Pforheim; Klaus Skabrond, Leonberg-Warmbronn; Ulrich Sauter, Tiefenbronn; Ulrich Maier, Freiberg; Roland Ebner, Villingen-Schwewnningen, all of Fed. Rep. of Germany

[73] Assignee: Dr. Ing. h.c.F. Porsche AG, Fed. Rep. of Germany

[21] Appl. No.: 413,757

[22] Filed: Sep. 28, 1989

[30] Foreign Application Priority Data

Sep. 29, 1988 [DE] Fed. Rep. of Germany ....... 3832971

[51] Int. Cl.$^5$ ...................... F16H 59/00; B60K 20/02
[52] U.S. Cl. ..................... 74/866; 74/473 R; 74/473 P; 74/335; 74/DIG. 7; 364/424.1; 340/456
[58] Field of Search ................. 74/335, 336 R, 473 R, 74/866, 878, 473 P, DIG. 7; 475/149, 153; 364/424.1; 340/456

[56] References Cited

U.S. PATENT DOCUMENTS

| | | | |
|---|---|---|---|
| 3,646,835 | 3/1972 | Ito et al. | 74/866 X |
| 3,650,161 | 3/1972 | Ito et al. | 74/866 |
| 4,425,620 | 1/1984 | Botcheller et al. | 74/866 X |
| 4,463,623 | 8/1984 | Miyata et al. | 74/473 R |
| 4,598,374 | 7/1986 | Klatt | 475/153 X |
| 4,610,179 | 9/1986 | Parker | 74/335 |
| 4,690,008 | 9/1987 | Klatt | 74/336 R |
| 4,873,891 | 10/1989 | Guanciale | 74/473 R |

FOREIGN PATENT DOCUMENTS

| | | | |
|---|---|---|---|
| 0269772 | 6/1988 | European Pat. Off. | 74/866 |
| 891661 | 8/1953 | Fed. Rep. of Germany . | |
| 2507086 | 8/1976 | Fed. Rep. of Germany . | |
| 3237517 | 4/1984 | Fed. Rep. of Germany . | |
| 3337930 | 7/1984 | Fed. Rep. of Germany . | |
| 3717674 | 12/1988 | Fed. Rep. of Germany . | |
| 3717675 | 12/1988 | Fed. Rep. of Germany . | |
| 3807881 | 9/1989 | Fed. Rep. of Germany . | |
| 1439675 | 6/1976 | United Kingdom | 74/866 |
| 8605449 | 9/1986 | World Int. Prop. O. | 364/424.1 |

OTHER PUBLICATIONS

*Road & Track*, Sep. 1990, pp. 110, 112–113.
Bosch Techn. Berichte 7 (1983) 4, Mohl et al., pp. 160–166.
ATZ (Automobiltechnische Zeitschrift) 85 (1983) 6—pp. 401–405.

*Primary Examiner*—Allan D. Herrmann
*Assistant Examiner*—Benjamin Levi
*Attorney, Agent, or Firm*—Evenson, Wands, Edwards, Lenahan & McKeown

[57] ABSTRACT

An indicating system for an automatic motor vehicle transmission is described which includes second indicating elements in addition to first indicating elements for indicating a preselected driving step. The second indicating elements, particularly during a semi-automatic operating mode of the motor vehicle transmission with a manual preselection of the gear steps, displays an actually shifted gear step. The first and second indicating elements are advantageously arranged in two vertical parallel rows in an indicating instrument of the motor vehicle.

15 Claims, 4 Drawing Sheets

INDICATING SYSTEM FOR AN AUTOMATIC MOTOR VEHICLE TRANSMISSION

BACKGROUND AND SUMMARY OF THE INVENTION

The invention relates to an indicating system for an automatic electronically or electrohydraulically controlled motor vehicle transmission, which is equipped with a selector lever for the preselection of individual or several automatically shiftable driving gear steps and which permits a fully automatic operating mode for the gear step selection or a semi-automatic operating mode in which the automatically shiftable gear steps may be preselected manually.

As a rule, automatic motor vehicle transmissions are equipped with a selector lever by means of which a vehicle driver can preselect individual or several automatically shiftable gear steps. In this case, the preselected gear step is made visually observable by means of indicating elements which are characterized for this purpose by alphanumerical signs or symbols (e.g., P, R, N, D, 3, 2, 1). Frequently, the indicating elements, in the manner of a scale, are arranged either in parallel to a shifting path in which the selector lever is guided or inside a switching panel such as inside a combination instrument together with several indicating instruments.

An automatic motor vehicle transmission having an indicating system of this type is described in Bosch "Technische Berichte", 7/1983)4, on Pages 160 to 166. However, in addition to a fully automatic operating mode for selecting the gear steps, this transmission also has a semi-automatic operating mode in which the individual gear steps of the forward gears (gear steps 1, 2, 3 and 4) may be preselected manually. The switching between the two operating modes takes place by means of a separate program selection switch.

Since, however, even during the manual operating mode, a shifting into a preselected gear step takes place only when the driving engine of the motor vehicle, after the shifting of the gears, runs within plausible predetermined rotational speed limits, the preselected gear steps and the gear steps into which the shifting took place may deviate from one another.

It is therefore an object of the invention to provide an indicating system for an automatic motor vehicle multi-speed transmission which indicates to a vehicle driver a momentary state of the transmission without noticeably diverting his attention from the traffic situation.

The invention is carried out by means of an arrangement wherein said indicating system includes:

first displaying means for displaying the preselected driving gear steps corresponding to the selector lever position by means of first indicating elements marked by alphanumerical symbols, and second displaying means for displaying an actual shifted gear step (I, II, III, IV), said second displaying means including second indicating elements which are viewable separately from and simultaneously with the first indicating elements. In especially preferred embodiments the first and second indicating elements are disposed close to but spared from each other.

The principal advantages of the invention are that an indicating system is provided which indicates the condition of the transmission, particularly the preselected and shifted driving step or gear step, to a vehicle driver without noticeably diverting his attention from the traffic situation. In addition, the indicating system permits a simple and effective differentiation with respect to the mode in which the transmission is operating (fully automatically or semi-automatically), and its construction is also very simple. As a result of the low required expenditures, the indicating system arrangement is also suitable for the retrofitting of existing indicating systems.

Other objects, advantages and novel features of the present invention will become apparent from the following detailed description of the invention when considered in conjunction with the accompanying drawings.

DETAILED DESCRIPTION OF THE DRAWINGS

Figure 1:
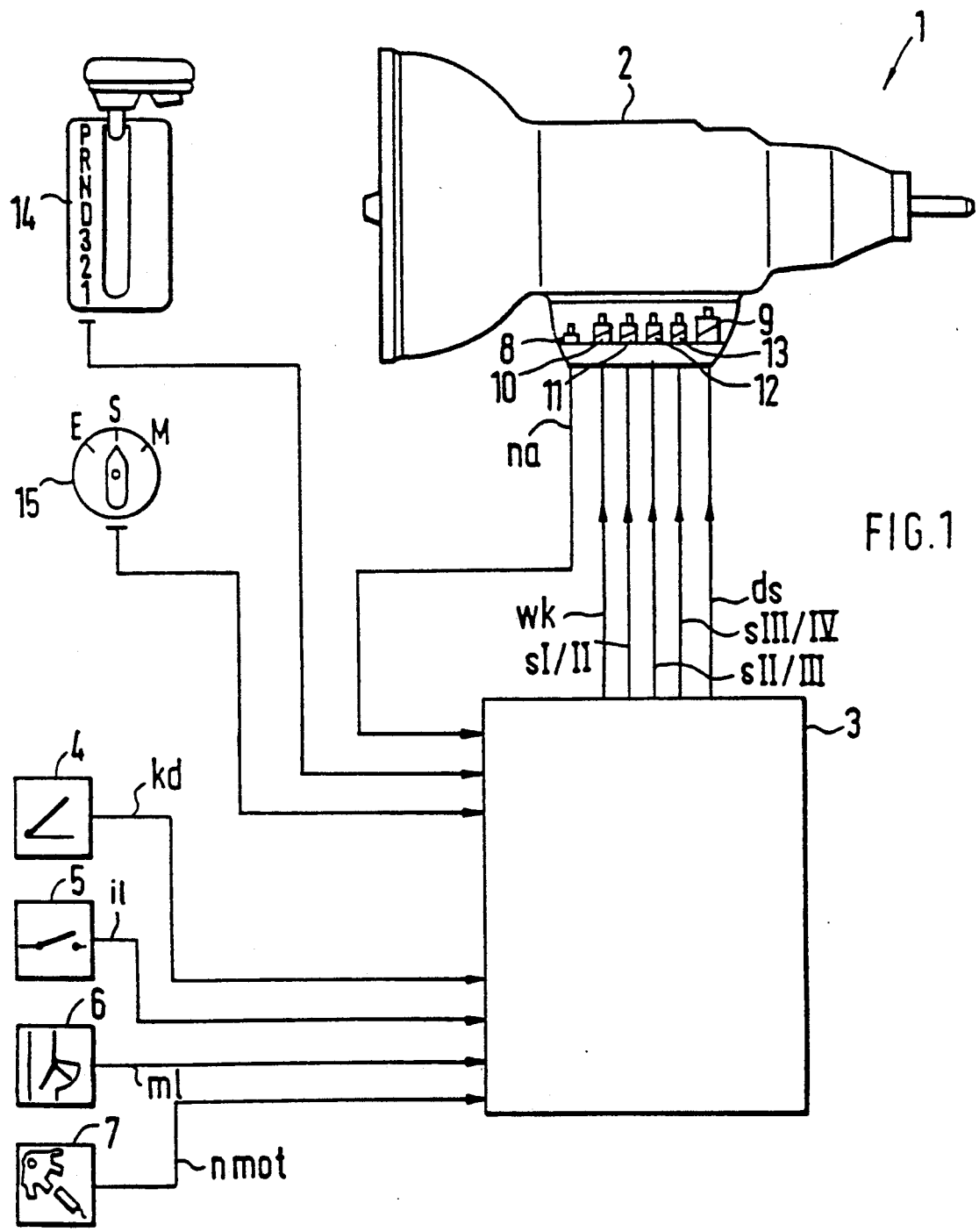
FIG. 1 is a block diagram of an electrohydraulic automatic motor vehicle transmission control according to the state of the art.

In FIG. 1, an electrohydraulic control of an automatic motor vehicle transmission 2 has the reference number 1, as described, for example, in Bosch "Technische Berichte", 7(1983)4, on Pages 160 to 166 and in ATZ 85 (1983)6, on Pages 401 to 405.

As a function of a kick-down signal kd of a kick-down sensor 4 at the accelerator pedal of the motor vehicle as well as of an idling signal 17 of a throttle valve switch 5, of an engine load signal ml of a load signal sensor 6 (air flow or air mass sensor, throttle valve angle sensor), and of a rotational engine speed signal nmot of a rotational engine speed sensor 7 of an internal-combustion engine, which is not shown, and of a transmission output rotational speed signal na of a transmission output signal sensor 8, a control unit 3 controls a pressure regulator 9 for a hydraulic fluid (signal output ds);

a first solenoid valve 10 for the control of a converter or of a converter lockup clutch (signal output wk);

a second solenoid valve 11 for the control of the gear step change between gear steps I and II (signal output sI/II);

a third solenoid valve 12 for the control of the gear step change between gear steps II and III (signal output sII/III); and a fourth solenoid valve 13 for the control of the gear step change between gear steps III and IV (signal output sIII/IV).

In this case, the control can be influenced by the vehicle driver by means of a selector lever 14 for the preselection of gear steps P, R, N, D, 3, 2, 1 and by means of a program selection switch 15 for the selecting of driving programs E, S, M.

In the shifting programs E and S, in which the shifting operations are controlled in a fully automatic operating mode according to optimal consumption and performance criteria, driving steps P (Parking), R (reverse gear step), N (idling gear steP), D (all four gear steps IV, III, II, I), 3 (limitation to the three lowest gear steps III, II, I), and 2 (limitation to gear steps II and I), and 1 (limitation to the first gear step I) may be selected.

In contrast, in shifting program M, a semi-automatic operating mode with a direct gear step preselection (D=IV, 3=III, 2=II, 1=I) is possible within meaningful predetermined (plausible) rotational speeds, in which case, when rotational speed limits are reached which may result in damage (overrevving) or stalling of the engine, an automatic upshifting or downshifting takes place. In the same manner, gear step changes are suppressed if the rotational speed of the engine, in the preselected gear step, were to leave the plausible rotational speed limits.

For the above-mentioned reasons, the preselected and the shifted gear step may deviate from one another. Since, however, in the case of conventional automatic transmissions, gear steps are indicated only corresponding to the selector lever position, the information concerning the actual condition of the transmission (shifted gear step, selected driving program) is lost.

Figure 2:
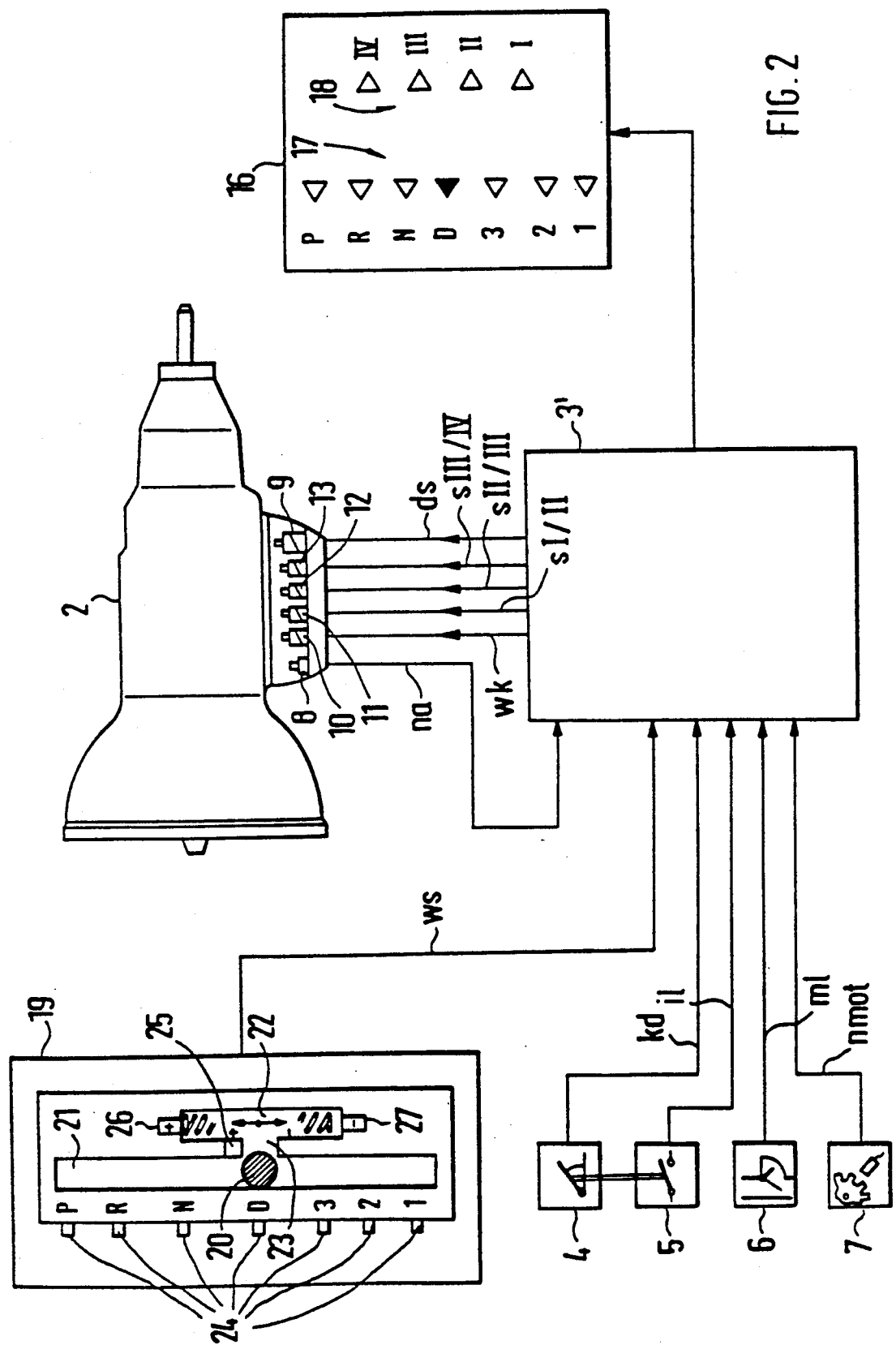
FIG. 2 is a block diagram according to FIG. 1, however for a gear shift lever guided in two parallel paths and an indicating system constructed according to a preferred embodiment of the invention.

In FIG. 2, an indicating system 16 according to the invention is therefore added to the transmission control 1 according to FIG. 1, this indicating system 16 comprising first indicating elements 17 and second indicating elements 18. The first indicating elements, in the fully automatic operating mode, indicate the position of the selector lever, i.e., the preselected driving step (P, R, N, D, 3, 2, 1) by controlling the corresponding indicating element in the form of a triangular symbol which is marked by the respective alphanumerical signs.

The second indicating elements 18, in a corresponding manner, particularly (or only) in the semi-automatic operating mode, indicate a shifted gear step IV, III, II or I. The first indicating elements 17 are naturally not controlled in the semi-automatic operating mode with a manual preselection of the gear steps.

As a result of the arrangement of the first and second indicating elements in two parallel rows (or corresponding to a shifting diagram of the selector lever), an easily remembered and understandable display of the transmission condition is obtained. As an example, a particularly advantageous arrangement is shown here together with a selector lever unit 19 which is described in detail in DE-OS 38 07 881.

A selector lever 20 is guided in a first shifting path 21 and in a second shifting path 22 which is parallel to it. The first shifting path 21 and the second shifting path 22 are connected with one another by means of a transverse path 23 arranged at the level of driving step D of the first shifting path. The conventionally constructed first shifting path 21 is used for the preselection of the driving steps P, R, N, D, 3, 2, 1 in the fully automatic operating mode.

Starting out of driving step D, the fully automatic operating mode may be left and the semi-automatic operating mode may be selected by moving the selector lever 20 via the transverse path 23 into the second shifting path 22. There, by swivelling the gear shift lever 20 held by spring force in a center position once into (+)- or (−)- direction, an upshifting or backshifting by one gear step respectively may be preselected which then, if its falls into plausible rotational speed ranges, is implemented while being controlled by the modified control unit 3'. The changed gear is then indicated by the second indicating elements 18. In the same manner, by means of swivelling the gear shift lever 20 via the transverse path 23, the semi-automatic operating mode may be left again in favor of the fully automatic operating mode.

For the scanning of the gear shift lever position, position detectors 24 are provided for positions P, R, N, D, 3, 2, 1 of the first shifting path 21 as well as a position detector 25 for sensing the gear shift lever position in the second shifting path 22 and one position detector 26 and 27 respectively for the scanning of the upshifting and of the backshifting preselection position of the gear shift lever 20.

Instead of the position detectors 24 (fully automatic operating mode), a coding switch may be provided at the gear shift lever which translates the seven angular positions of the selector lever 20 into a certain three-digit binary code. It is also contemplated to translate the signals of the position detectors 24 to 27, by way of a coding module, into a four-digit binary code in order to further reduce the number of lines (output signal ws) between the gear shift lever unit 19 and the modified control unit 3'. There, the corresponding binary information, in a decoding unit or in a partial software program, will then be decoded again to the gear shift lever position.

The controlling of the indicating system 16 may now take place either by means of the control unit 3', in that this control unit 3' senses the selector lever position and controls the first indicating elements 17 and the second indicating elements 18 corresponding to the selector lever position and corresponding to the shifted gear step.

Figure 3:
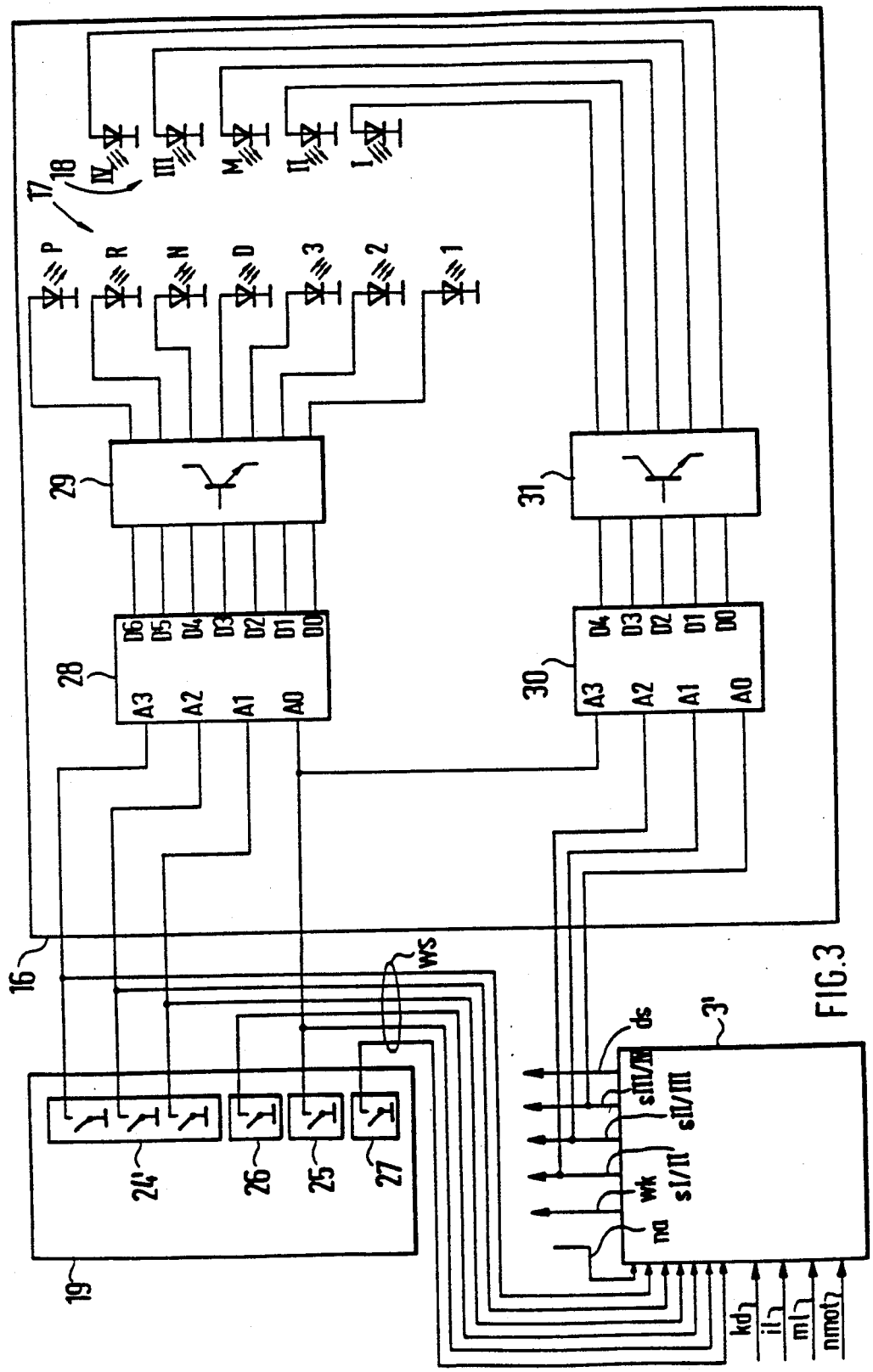
FIG. 3 is a diagram of connections of an indicating system according to FIG. 2.

Naturally, it is also contemplated to connect the indicating system directly to the selector lever unit and to derive the control of the second indicating elements from the signal outputs sI/II, sII/III, sIII/IV, as shown in FIG. 3. A case is assumed here in which the selector lever position in the first shifting path is available as binary information from a coding switch 24'.

The three lines from the decoding switch 24' of the selector lever unit 19, together with the signal from the position detector 25 (gear shift lever 20 in the second shifting path 22) are led to a first decoding module 28 which, as a function of the signal combination present at its inputs A0–A3, at one of its outputs D0–D6, controls a signal for the control of one of the first indicating elements 17 by means of a drive module 29 (which is not absolutely necessary). Without limiting the generality, light-emitting diodes are entered here as the indicating elements.

A second decoding module 30, at its inputs A0–A3 is acted upon by the signals of the signal outputs sI/II, sII/III, sIII/IV of the modified control unit 3' for the control of the shift valves 11, 12, 13 and by the signal of the position detector 25 and, as a function of the input combination, controls one of the outputs D0–D4. A driver module 31 amplifies the output signal and controls one of the indicating elements 18, in which case, in addition, an indicating element may be used which is marked by an M and which lights up continuously in the semi-automatic operating mode.

In this case, the two decoding modules may also be constructed as programmable memory modules, in which case a certain input datum which serves as an address (or a certain signal combination) at inputs A0–A3 (address bus) controls a certain memory location. This memory location contains a datum with a logic one at that point of outputs D0–D6 (data bus) which controls the corresponding indicating element.

Depending on the shifting path in which the gear shift lever 20 is located, the position detector 25 is used for the control of either the first or the second indicating elements 17, 18.

Figure 4:
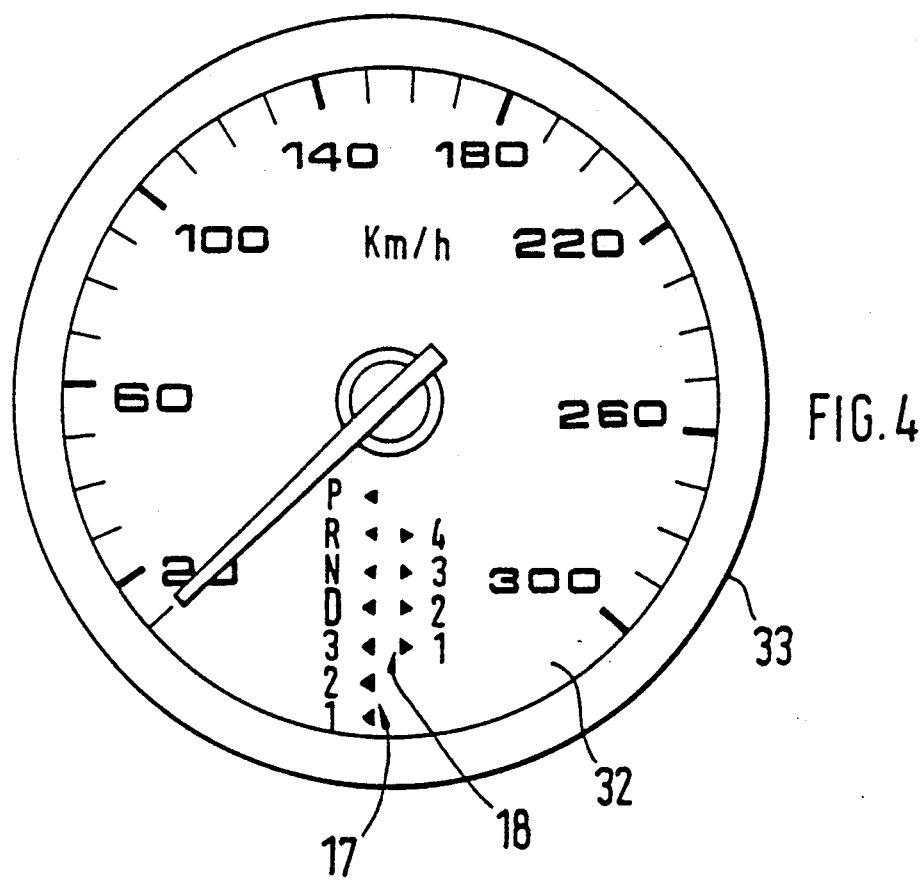
FIG. 4 is a schematic view of a round instrument having an indicating system according to FIG. 2.

FIG. 4 finally shows the arrangement of the indicating system with the first indicating elements 17 and the second indicating elements 18 inside a front display panel 32 of a driving speed indicating instrument 33. The indicating system may naturally be arranged in any indicating instrument of a motor vehicle, which, however, should be located as centrally as possible within the angle of view of the vehicle driver.

It is also contemplated to display, in addition to the shifted gear step, also a preselected gear step (flashing), if the preselected and the shifted gear step deviate from one another.

The controlled indicating elements should be visible under all conceivable lighting conditions (outside light, stray light) for at least as long as either the ignition switch of the motor vehicle is actuated or any light (headlights, interior light) is switched on.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An indicating system of an electronically or electrohydraulically controlled motor vehicle multi-speed transmission, said transmission having a selector lever for the preselection of a driving position in which are engaged individual or several automatically shiftable driving gears in a fully automatic operating mode and a semi-automatic operating mode in which the driving gear may be selected manually, said indicating system including:

first displaying means for displaying the preselected driving position corresponding to the selector lever position by means of first indicating elements marked by alphanumerical symbols, and second displaying means for displaying an indication of a driving gear that is currently engaged, said second displaying means including second indicating elements which are viewable separately from and simultaneously with the first indicating elements;

wherein the first and second indicating elements are spaced from one another; and wherein the second indicating elements are controlled only during the semi-automatic operating mode with a manual selection of the driving gears.

2. An indicating system according to claim 1, wherein at least the first indicating elements are arranged corresponding to a shifting diagram of the selector lever.

3. An indicating system according to claim 2, wherein the first indicating elements are arranged in a first row and the second indicating elements are arranged in a second row and both rows being situated in parallel with one another.

4. An indicating system according to claim 2, wherein the first and second indicating elements are arranged in a front display panel of an indicating instrument located centrally within a field of vision of a vehicle driver inside a tachometer or a driving speed indicator.

5. An indicating system according to claim 2, wherein the controlled indicating elements, under most lighting conditions, are visible at least as long as an ignition switch of the motor vehicle is actuated or any light of the motor vehicle is switched on.

6. An indicating system according to claim 2, wherein the first indicating elements are controlled directly or by means of power amplifiers by position switches sensing the position of the selector lever.

7. An indicating system according to claim 1, wherein the first indicating elements are arranged in a first row and the second indicating elements are arranged in a second row and both rows being situated in parallel with one another.

8. An indicating system according to claim 7, wherein the first and second indicating elements are arranged in a front display panel of an indicating instrument located centrally within a field of vision of a vehicle driver inside a tachometer or a driving speed indicator.

9. An indicating system according to claim 7, wherein in the row of the second indicating elements, in addition to the indication of the driving gear that is currently engaged, the selected driving gear is also indicated.

10. An indicating system according to claim 9, wherein the selected driving gear is indicated in a flashing manner.

11. An indicating system according to claim 1, wherein the first and second indicating elements are arranged in a front display panel of an indicating instrument located centrally within a field of vision of a vehicle driver inside a tachometer or a driving speed indicator.

12. An indicating system according to claim 11, wherein the first indicating elements and the second indicating elements are respectively arranged in rows relative to one another so as to correspond to an arrangement of first and second shifting paths which are connected with one another by means of a transverse path and extend in parallel to one another, the first shifting path being used for the preselection of the driving positions in the fully automatic operating mode, and the second shifting path being used for the preselection of the driving gears in the semi-automatic operating mode, and the selector lever, in the second shifting path, being guided in the manner of a rocker-type shifting arrangement in such a manner than, when the selector lever is swivelled into one direction (+) from a neutral center position located in the area of the transverse path and constructed as a stable inoperative position, the preselected of the driving gear may be increased by one gear respectively, and when the selector lever is swivelled into another direction (−), may be decreased by one gear respectively.

13. An indicating system according to claim 12, wherein the controlled indicating elements, under most lighting conditions, are visible at least as long as an ignition switch of the motor vehicle is actuated or any light of the motor vehicle is switched on.

14. An indicating system of an electronically or electrohydraulically controlled motor vehicle multi-speed transmission, said transmission having a selector lever for the preselection of a driving position in which are engaged individual or several automatically shiftable driving gears in a fully automatic operating mode and a semi-automatic operating mode in which the driving gear may be selected manually, said indicating system including:

first displaying means for displaying the preselected driving position corresponding to the selector lever position by means of first indicating elements marked by alphanumerical symbols, and second displaying means for displaying an indication of a driving gear that is currently engaged, said second displaying means including second indicating elements which are viewable separately from and simultaneously with the first indicating elements;

wherein the second indicating elements are controlled only during the semi-automatic operating mode with a manual selection of the driving gears; and wherein at least the first indicating elements are arranged corresponding to a shifting diagram of the selector lever.

15. An indicating system of an electronically or electrohydraulically controlled motor vehicle multi-speed transmission, said transmission having a selector lever for the preselection of a driving position in which are engaged individual or several automatically shiftable driving gears in a fully automatic operating mode and a semi-automatic operating mode in which the driving gear may be selected manually, said indicating system including:

first displaying means for displaying the preselected driving position corresponding to the selector lever position by means of first indicating elements marked by alphanumerical symbols, and second displaying means for displaying an indication of a driving gear that is currently engaged, said second displaying means including second indicating elements which are viewable separately from and simultaneously with the first indicating elements;

wherein the second indicating elements are controlled only during the semi-automatic operating mode with a manual selection of the driving gears; and wherein the first indicating elements and the second indicating elements are respectively arranged in rows relative to one another so as to correspond to an arrangement of first and second shifting paths which are connected with one another by means of a transverse path and extend in parallel to one another, the first shifting path being used for the preselection of the driving positions in the fully automatic operating mode, and the second shifting path being used for the preselection of the driving gears in the semi-automatic operating mode, and the selector lever, in the second shifting path, being guided in the manner of a rocker-type shifting arrangement in such a manner that, when the selector lever is swivelled into one direction (+) from a neutral center position located in the area of the transverse path and constructed as a stable inoperative position, the preselection of the driving gear may be increased by one gear respectively, and when the selector lever is swivelled into another direction (−), may be decreased by one gear respectively.

* * * * *